United States Patent [19]

Kutchenriter et al.

[11] Patent Number: 4,978,223
[45] Date of Patent: Dec. 18, 1990

[54] DETERMINATION OF DIMENSIONS OF TUBES

[75] Inventors: Kevin W. Kutchenriter, Latrobe; Leo J. Moga, Jeannette, both of Pa.

[73] Assignee: Westinghouse Electric Corp., Pittsburgh, Pa.

[21] Appl. No.: 320,735

[22] Filed: Mar. 8, 1989

[51] Int. Cl.$^5$ ........................ G01B 11/06; G01B 11/08
[52] U.S. Cl. ..................................... 356/384; 356/381
[58] Field of Search ............... 356/384, 385, 386, 387; 250/560; 364/560, 563

[56] References Cited

U.S. PATENT DOCUMENTS

| | | | |
|---|---|---|---|
| 4,298,285 | 11/1981 | Ito | 356/376 |
| 4,456,379 | 6/1984 | Schumann et al. | 356/381 |
| 4,576,482 | 3/1986 | Pryor | 356/376 |
| 4,634,273 | 1/1987 | Farleman et al. | 356/73 |
| 4,638,168 | 1/1987 | Marino et al. | 250/560 |

FOREIGN PATENT DOCUMENTS

| | | | |
|---|---|---|---|
| 56-81417 | 7/1981 | Japan | 356/376 |
| 57-142505 | 9/1982 | Japan | 356/384 |
| 57-188504 | 10/1984 | Japan | 356/376 |
| 815487 | 3/1981 | U.S.S.R. | 356/384 |
| 836518 | 6/1981 | U.S.S.R. | 356/384 |
| 945648 | 7/1982 | U.S.S.R. | 356/384 |

Primary Examiner—F. L. Evans
Attorney, Agent, or Firm—Hymen Diamond

[57] ABSTRACT

Measurement of lengths for determining the outside diameter, wall thickness or inside diameter of tubes which, must be maintained to close tolerances. A mandrel of tungsten carbide having a coaxial projection of knife-edge width is postioned so that its transverse dimension intersects the beam and is parallel to the plane of the beam. A first length is measured between the end of the beam and the nearest point on the projection. A tube is mounted on the projection with its its longitudinal axis parallel to the longitudinal axis of the mandrel and its inner surface engaging this. A second length is measured from the end of the beam and the nearest point on the tube. The outside diameter is measured on the shadow of the tube produced by the laser between the shadow of the nearest point and the shadow of the most remote point from the end of the laser beam. The wall thickness is equal to the first length less the second length. The inside diameter is the outside diameter less twice the wall thickness. An advantage of this invention is that the measurement is carried out with only one instrument instead of two as required by prior art.

13 Claims, 9 Drawing Sheets

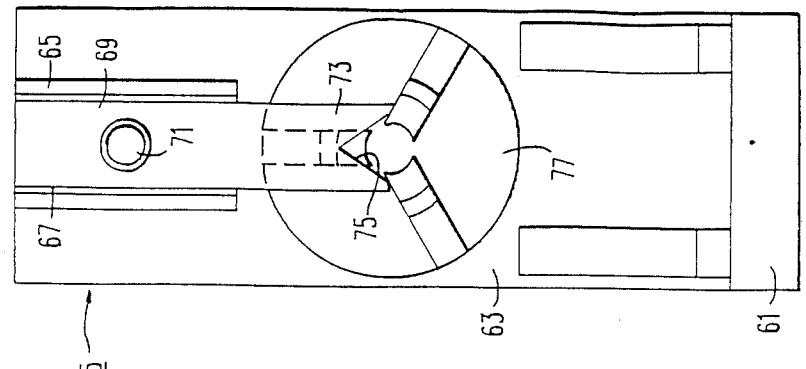
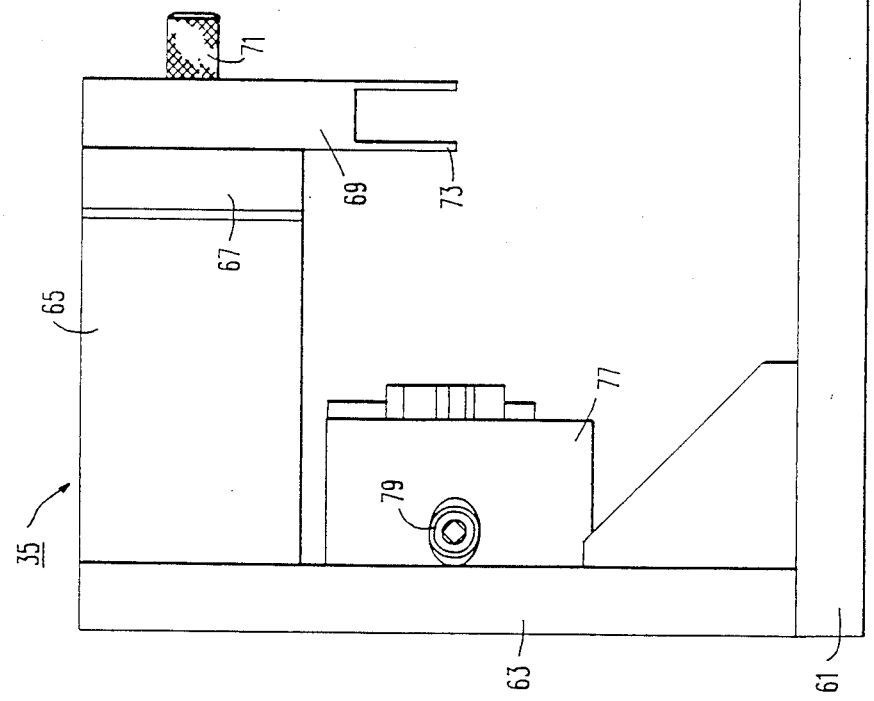

FIG. 5
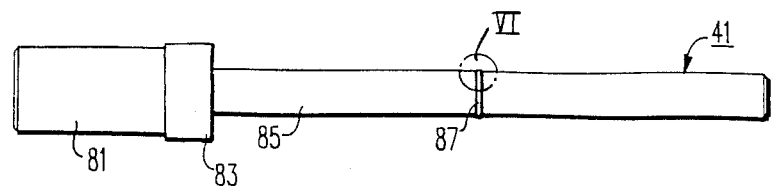
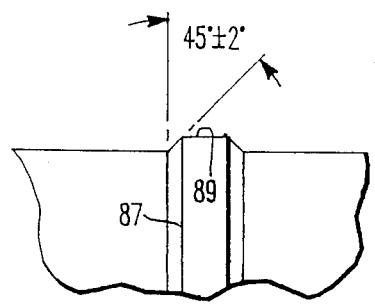
FIG. 6
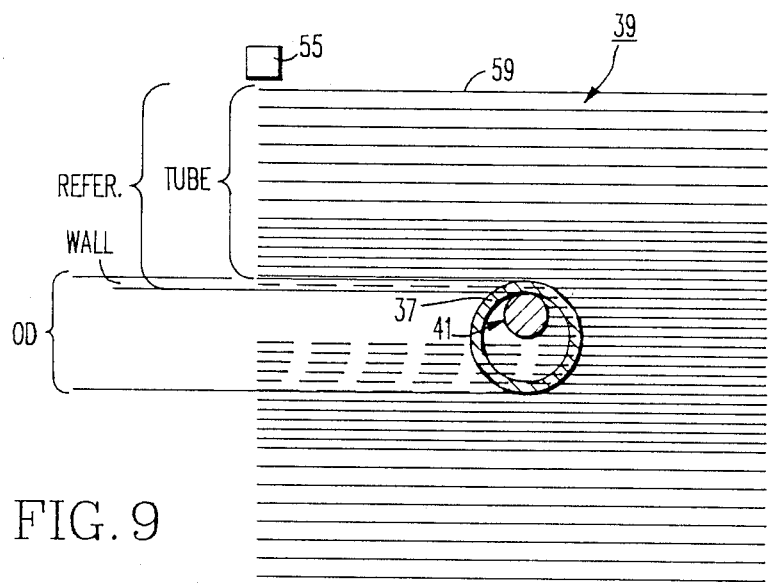
FIG. 9

DETERMINATION OF DIMENSIONS OF TUBES

BACKGROUND OF THE INVENTION

This invention relates to the art of measurement and it has particular relationship to the determination of the dimensions of a tube; or more generally, a hollow cylinder. Specifically, this invention concerns itself with the determination of the outside diameter, wall thickness and inside diameter of tubes, typically composed of zirconium alloys, which are used as cladding for nuclear fuel elements. The adaptation of this invention to tubes for cladding will be emphasized in the description of this invention which follows in the interest of facilitating the understanding of this invention by relating its description to a concrete adaptation. It is to be understood that the adaptation of the principles of this invention to other uses which may differ materially from its use on nuclear cladding is within the scope of equivalents of this invention, in line with the Doctrine of Equivalents as interpreted and explained in Uniroyal, Inc. v. Rudkin-Wiley Corp. 5 U.S. Patent Quarterly 2d 1434 (CAFC 1988) (at 2, pg. 1443).

This invention is uniquely adapted to the measurement of tubes for use in cladding because it is tailored to deal with the close tolerances, within a few ten-thousands of an inch, which must be maintained in the dimensions of these tubes. Typically, the blank from which the tubes for cladding are made, initially, has an outside diameter of 2.5 inches. It is reduced, typically in four cold pilgering passes, to a diameter nominally of 0.374-inch. The wall thickness is reduced from 0.300-inch to between 0.02290 and 0.02340 typically.

Typically, the processing starts with blanks which are processed in batches. There are about six starting blanks in each batch. Typically, there are four cold pilgering passes for each batch. Each pilgering pass is followed by deburring, pickling and annealing operations. The fourth pilgering pass is followed by straightening; pickling and polishing and other minor operations. Each final tube is then subjected to ultrasonic testing to determine if it meets requirement. During the processing of a batch, (six blanks) samples are cut randomly every two hours for testing. The pilgering reduces the thickness of a blank and multiplies the number of blanks derived from the starting blank and, ultimately, the number of finished tubes. The multiplication of the number of blanks and ultimate tubes are shown in the following Table I:

TABLE I

| No. of Pass | Reduction in Outside Diameter (Inches) | Typical No. of Reduced Blanks & Tubes Produced |
| --- | --- | --- |
| 1st | 2.5 to 1.75 | 2 |
| 2nd | 1.75 to 1.25 | 6 |
| 3rd | 1.25 to 0.7 | 24 |
| 4th | 0.7 to 0.374 | 136 |

The complete processing of final fourth pass pilgering consumes about five eight-hour shifts. The time taken for each pass and the number of samples cut during each pass (at two-hour intervals) are shown in the following Table II:

TABLE II

| No. of Pass | Time in Hours | Minimum No. of Samples Cut |
| --- | --- | --- |
| 1st | 2 to 3 | 1 to 2 |
| 2nd | 6 | 3 to 4 |
| 3rd | 12 to 15 | 6 to 8 |
| 4th | 40 | 20 to 30 |

The samples are cut at random from the batch. This invention concerns itself with the determination of the OD, wall thickness and ID of the random samples in the testing, i.e., the inspection of the samples and with the evaluation of the results of the testing.

In accordance with the teaching of the prior art, the inspection of the dimensions of the samples during the processing was carried out manually. The inspection used two instruments: one, to measure the OD and the other, the ID. During the inspection, the minimum and maximum points of the OD and ID were determined. Each sample was placed on a fixture and a laser beam was projected on the sample to produce a shadow. The sample was rotated and displaced longitudinally and the OD measured on the shadow in each position. By comparing the measurements, a maximum and minimum OD was determined for the sample. The sample was then inserted in an air gauge of diameter corresponding to the ID of the sample and rotated and displaced longitudinally, while the pressure of the gauge was read to determine the maximum and minimum ID dimensions for the sample. This data was also recorded. The maximum and minimum dimensions for OD and ID were plotted for a number of samples and based on the plots, a decision was reached as to whether or not, and to what extent, to adjust the pilgering apparatus.

A disadvantage of this practice is that it lends itself to reacting to isolated extreme data. Since only the maximum and minimum extremes are being recorded permanently and used for future evaluation of the operation, the pilgering process is essentially being controlled by extremes. There may be instances where only one point is outside of the controlling limits because of random chance, while actually the pilgering apparatus is operating properly. For example, the sample may have a pit or a burr or a speck of dirt which is picked up as a maximum or minimum. In this case, there is an indication that the setting for the operation should be changed, notwithstanding that the apparatus is operating to produce blanks or tubes within the dimensional limits.

An important disadvantage of the prior-art practice is that it requires two instruments: the fixture and laser for measuring OD and the air pressure gauge for reading ID.

Another disadvantageous aspect of the prior-art practice is that the measurements are, to an extent, dependent on the personal characteristics of the inspector and on his condition at any time. Different inspectors may handle the air gauge which measures the ID differently, or they may read it differently, or they may record the data erroneously, or the number of observations from inspector to inspector may vary. The prior-art process is also time consuming.

It is an object of this invention to overcome the deficiencies and drawbacks of the prior art and to provide a method and apparatus for determining the outside diameter, wall thickness and inside diameter of a sample in whose practice and use the evaluation of the results of the determination shall not be governed by extremes.

An important object of this invention is to provide such a method and apparatus in whose practice and use only one instrument shall be required to measure OD, wall thickness and ID. It is also an object of this invention to provide such method and apparatus whose practice and use shall not be materially affected by personal characteristics and condition at any time of the personnel practicing the method or using the apparatus. It is a further object of this invention to provide such method and apparatus whose practice and use shall not be excessively time consuming.

SUMMARY OF THE INVENTION

In accordance with this invention, the OD, wall thickness and ID of sample tubes, typically three inches in length, are measured with a laser micrometer which produces a planar laser beam. The output of the laser micrometer is connected to a computer which is programmed to carry out the computations involved in the inspection and to produce the displays which are desired or required. The test sample is mounted on a mandrel which is positioned with its transverse dimension intersecting the plane of the laser beam. The sample is so mounted that its transverse dimension also intersects the laser beam. Initially, the length, here defined as a first length, from a sharply defined end of the laser beam to the nearest point on the mandrel is measured. This magnitude is entered in the computer for use with the test samples which are to be evaluated. With the tube positioned on the mandrel, the length, here defined as the second length, from the end of the laser beam to the nearest point on the tube is measured. The wall thickness at any setting of the tube is the difference between the first length and the second length. The OD is determined by measuring the length between the nearest point from the sharply defined end of the laser beam to the most remote point from the laser beam. The lengths are measured in different positions of the tube on the mandrel both angularly, set by turning the tube, and longitudinally, set by reversing or shifting the tube longitudinally. Typically, eight such readings are taken, since for eight readings the probability is high that the ultimate result is accurate. The readings are averaged to determine a mean magnitude. Since a mean is derived, the effect of any magnitude resulting from an abnormality which does not require change in the pilger apparatus is reduced so that its influence in evaluating the measurements is minimized. The readings are entered and are averaged in the computer and the means are compared to limits entered in the memory of the computer to determine if the operation should be changed. The computer also provides a plot showing the deviations from a selected magnitude. Since each reading is stored in the computer, the inspector can avail himself at any time of the readings to evaluate the problem areas by analyzing the graphs produced for previous samples from any pilger machine. In case of the prior-art practice, only the maximum and minimum intelligence is recorded and is available for evaluation.

The only instrument required to determine all three parameters is the laser micrometer. The necessity of processing a sample in one instrument to determine OD and then removing the sample to another instrument is dispensed with.

Features of this invention which are unique to the monitoring of objects such as tube samples for cladding, in whose practice one or a few ten-thousands of an inch is an important factor, will now be described. The mandrel is suspended as a cantilever because two-point suspension would require that the heights of the supports be matched within a magnitude of the order of a ten-thousandth of an inch. An inequality in height of two supports of one or two ten-thousands of an inch would produce a deflection in the mandrel which would appreciably affect the measurements. The tube should be mounted on a knife edge as nearly as practicable because it is essential to eliminate the effects of small variations in the mandrel surface, undulations of small amplitude in the inner surface of the sample tube and burrs on the outer surface of the mandrel or the inner surface of the sample which might be present in the region of engagement of the sample and the mandrel. With a burr on the inner surface of the tube or the outer surface of the mandrel in the region of engagement, the tube would not be positioned level on the mandrel. For these reasons, the mandrel is provided with a projection or step of small width slightly greater than the width of the laser beam to support the sample. Typically, the laser beam has an approximate width of 0.016-inch and the projection a width of 0.030-inch. It is also necessary that the deflection caused by the end of the mandrel extending from the projection be counteracted. For this purpose, a small weight is suspended on the sample in the region of the projection.

BRIEF DESCRIPTION OF DRAWINGS

For a better understanding of this invention, both as to its organization and as to its method of operation, together with additional objects and advantages thereof, reference is made to the following description, taken in connection with the accompanying drawings, in which:

FIG. 3 is a view in side elevation of the mandrel-and-tube-supporting fixture of the apparatus shown in FIG. 2;

FIG. 4 is a view in end elevation taken in the direction IV—IV of FIG. 3;

FIG. 5 is a view in side elevation of the mandrel of the apparatus shown in FIG. 2;

FIG. 6 is a fragmental view enlarged of the part of the mandrel shown in circle VI of FIG. 5;

FIG. 9 is a fragmentary diagrammatic view with the laser beam in side elevation showing the interaction of the laser beam, the mandrel and the sample;

DETAILED DESCRIPTION OF EMBODIMENT OF INVENTION OF METHOD OF PRACTICING INVENTION

Figure 1:
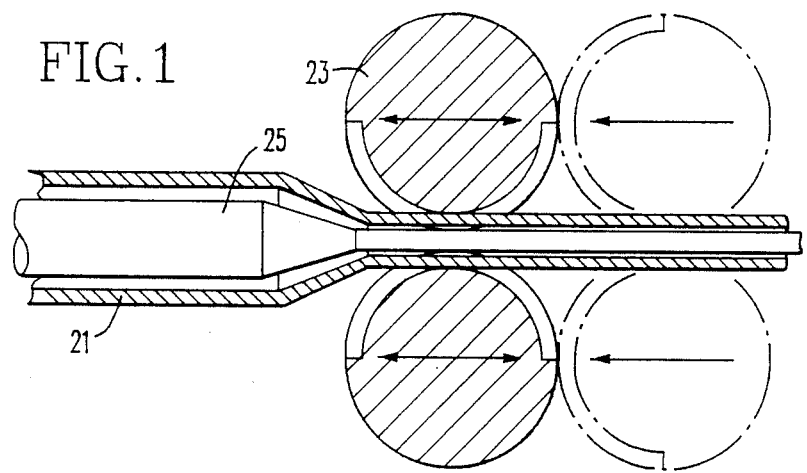
FIG. 1 is a diagrammatic fragmental view illustrating a pilgering operation in which this invention plays an important role.

As shown in FIG. 1, a pilgering operation or pass on a blank 21 is carried out by rolling dies 23. The blank 21 is mounted coaxially on an appropriately shaped and dimensioned mandrel rod 25 and while the tube is rotated about its axis, the rolling dies 23 are rolled forwardly and backwardly under pressure, reducing the thickness and increasing the length of the blank. Typically, in forming a fine Zircaloy tube for cladding, four pilgering passes are carried out in reducing the OD from 2.5 inches to 0.374 -inch. After each pass, the resulting blank is cut into a number of tubes of approximately the original length of the blank. After the final pass, there are, typically, 136 tubes of approximately the length of the original blank. Sample tubes as shown in the above Table II are cut periodically during each pass and are evaluated in accordance with this invention. These sample tubes are cut randomly from the same batch as the processing of the batch proceeds. In the practice of this invention, the mean outside diameter and the mean wall thickness and the mean inside diameter of the samples are determined and the pilgering is controlled in accordance with the evaluation of these determinations.

Figure 8:
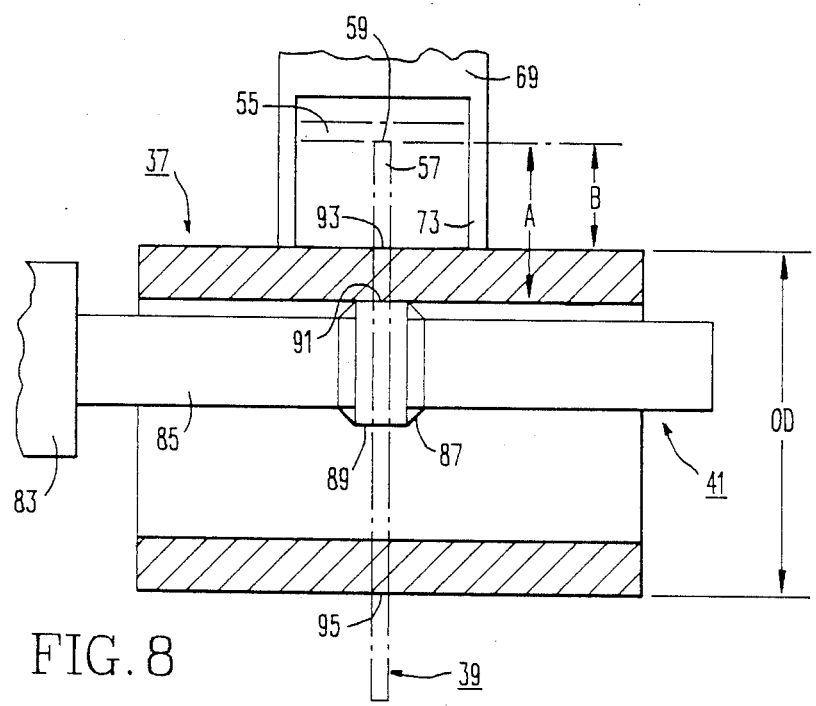
FIG. 8 is a fragmentary diagrammatic view with the tube sectioned showing the relationship of the mandrel and tube sample to the laser beam.

The apparatus 31 (FIG. 2) for determining the OD, wall thickness and ID of each sample tube includes a laser micrometer 33, a bracket or frame 35 for subjecting a sample 37 (FIG. 8) to the laser beam 39, a mandrel 41 and a computer 43. The laser micrometer 33 is procured from Lasermicke, Inc., Dayton, Ohio. The computer 43 may be of any available appropriate type. Typically, the computer is of communication type RS232 procured from IBM. The laser micrometer 33 includes a housing 45 in which the laser beam 39 is generated and a housing 47 in which the measurement is carried out. The laser micrometer 33 is provided with a control box 49 which is connected through a cable 51 with the laser in the housing 45 and with the measurement components in the housing 47. The control box 49 is interfaced with the computer 43 through a cable 53. Through this cable 53, the computer transmits command signals to the laser micrometer 33 and receives intelligence from this micrometer. The computer 43 is programmed to convert the analog data from housing 47 into digital data.

The computer 43 (FIG. 2) is connected to a monitor 90. A key pad 92 is provided for setting the operation of the computer and for selecting the display on the monitor.

Figure 2:
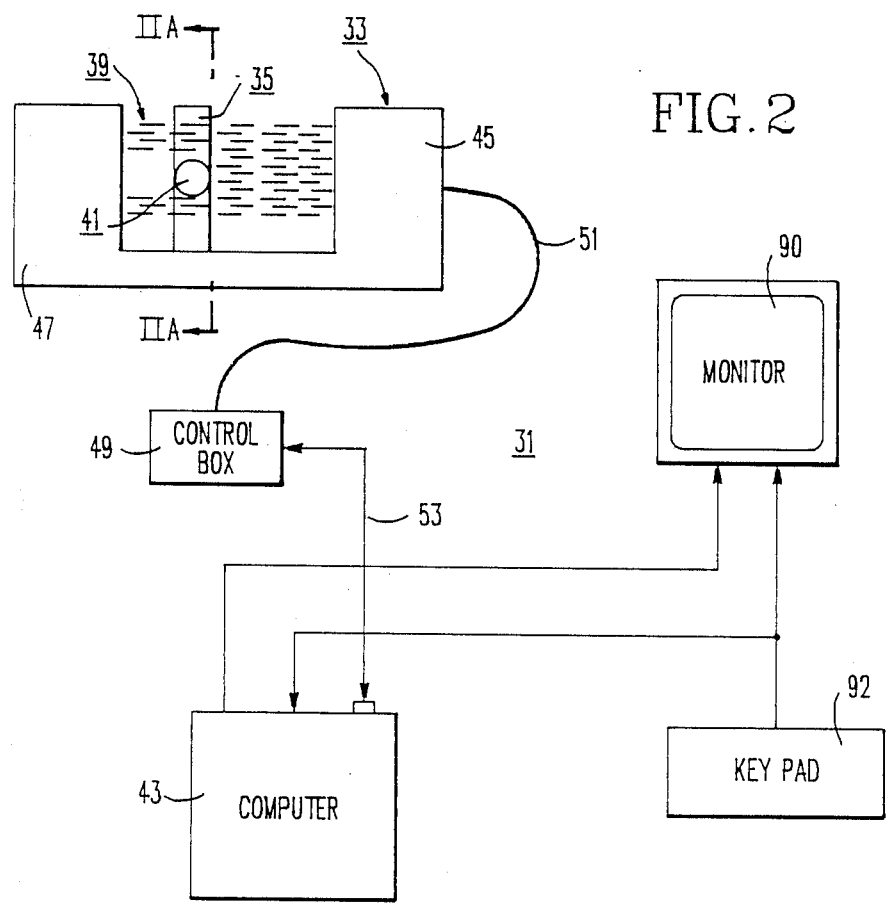
FIG. 2 is a view partly diagrammatic and partly schematic showing an embodiment of this invention which serves also for practicing the method of this invention.
Figure 2A:
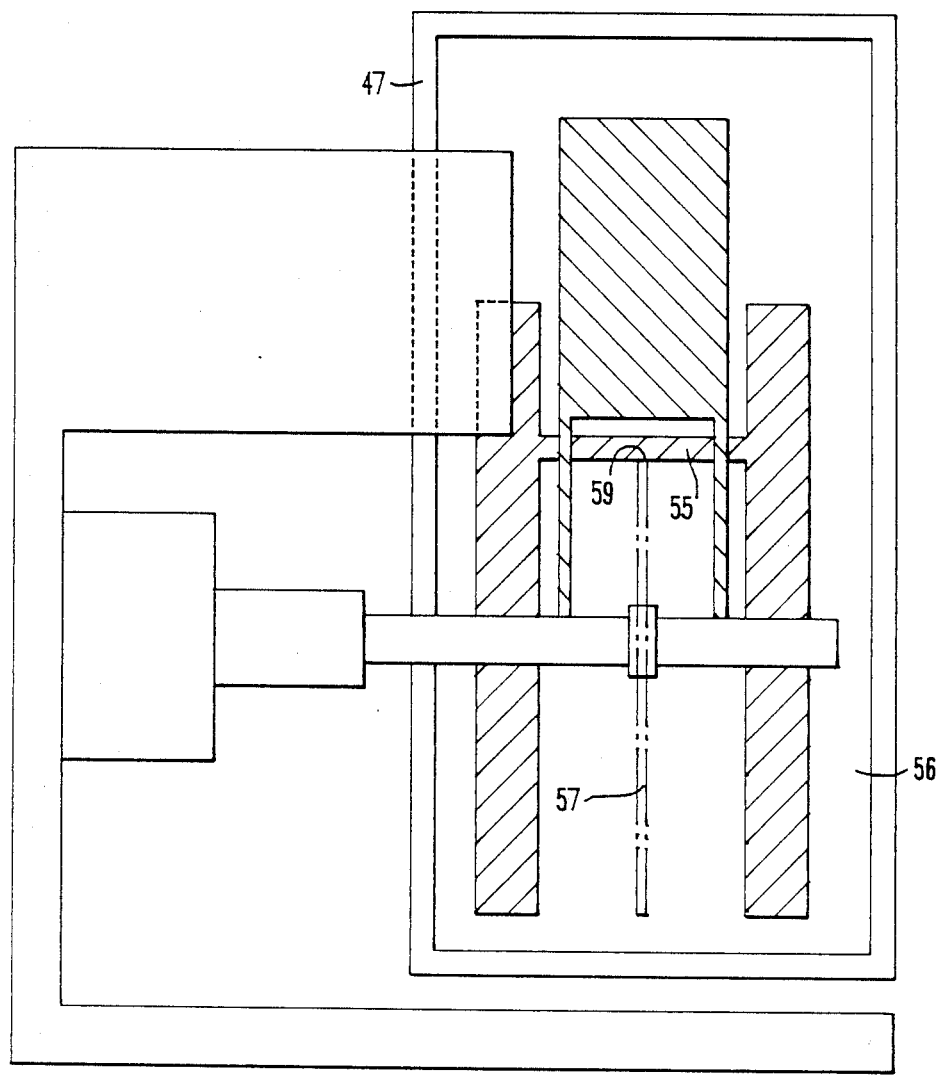
FIG. 2A is a view in front elevation of the receiving housing of the laser micrometer and fixture.
Figure 7:
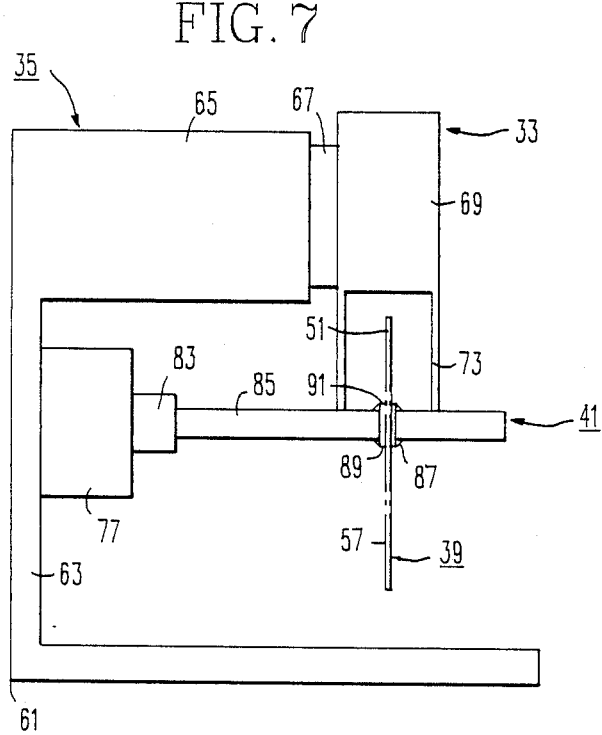
FIG. 7 is a fragmentary diagrammatic view generally in side elevation showing the relationship of the mandrel and sample-support fixture, to the mandrel and the laser beam.

The laser beam is planar as shown in FIGS. 2 and 9 and of small width as shown in FIG. 7 having the general shape of a sheet. A bar 55 (FIG. 2A) is provided across the opening 56 in measurement housing 47 through which the beam is transmitted to block the emission from the top of the laser which may flutter. The laser beam which is transmitted between the housings 45 and 47 produces a band 57 (FIG. 2A) having a sharply defined end 59 which serves as a reference from which reliable measurements can be made.

The frame 35 (FIGS. 3, 4) includes an angular support 61, braced in the corner. At the top of the vertical arm 63 of the support, a member 65 of rectangular transverse cross section is welded. At its outer end, this member 63 carries a slide 67 on which a weight 69 is vertically slideably mounted. The weight is provided with a knob 71 by which it can be manipulated. The weight 69 has tines 73 at the end which have V-notches 75 for engaging the upper surface of the sample 37 or of the mandrel 41. A chuck 77, for suspending the mandrel 41, is mounted on the arm 63 below the member 65. The chuck 77 is provided with a mechanism 79 for locking the mandrel 41. The weight 69 has a magnitude such as to counterbalance the tendency of the rod 41 to deflect under its weight.

The mandrel 41 (FIGS. 5, 6) is precisely dimensioned. At one end it has a section 81 of expanded diameter which terminates inwardly in a shoulder formed by a section 83 of still greater diameter The section 81 serves for engagement of the mandrel 41 by the clutch 77. The section 85 of the mandrel 41, which extends from section 83, is of reduced diameter. Between the ends of this section 85, a projection or step 87 is provided. The projection has cylindrical surface 89 joined to the body of the mandrel by a tapered (conical) surface (FIG. 6). The width of the cylindrical surface 89 is slightly greater than the width of the laser beam. As stated, the width of the beam may be typically 0.016-inch and width of the surface 89 may typically be 0.030 as shown.

In the practice of this invention, the mandrel 41 is inserted, aligned and locked in the chuck 77. The frame 35 is then positioned with respect to the laser micrometer 33 so that the plane of the laser beam is perpendicular to the longitudinal axis of the mandrel and the mandrel intersects the laser beam 39 centrally along the cylindrical surface 89 of the projection 87. The weight 69 is brought into engagement with the mandrel. The distance along the band of light 57, in the housing 47 between the end 59 of the band and the nearest point 91 on the cylindrical surface 89, is measured and recorded. This is the length A of FIG. 8, herein referred to as "first length". The weight 69 is now raised and a sample 37 is centered on the surface 89 of the mandrel 41 and the weight 69 is then permitted to engage the surface of the sample 37 with its tines 73 spanning the surface 89. The weight 69 is positioned so that the sample is balanced on surface 89. The length from the end 59 of the laser beam to the nearest point 93 on the sample is measured. This length is identified as B in FIG. 8 and is herein referred to as the "second length". The wall thickness in the position of the sample 37 is equal to A—B. The length between the nearest point 93 and the most remote point 95 from the end 59 is measured on the shadow of the sample 37. This length is herein called the "third length" and is the OD of the sample in the position in which it was taken. The first, second and third lengths are automatically measured in the housing 47 and are entered in the computer 43. The sample 37 is now rotated about its longitudinal axis over random angles to a plurality of different positions and at each position the wall thickness and OD is determined. Then the sample 37 is reversed and centered on surface 59 and a plurality of additional determinations of the OD and wall thickness are taken and entered in the computer. The computer computes the average or mean of the measurements of the OD and wall thickness. The average ID is OD-2 wall thickness and is also calculated by the computer.

The sample 37 is rotated and reversed to account for variances along the circumference of the sample and internally. The sample can also be shifted over a limited range about its center and the weight may be set to counterbalance the sample in the shifted position The rotation records wall surface variations. In the practice of this invention, the parameters are entered simultaneously in the computer so that the inspection is accomplished with only one instrument and not two as required by the prior art.

The above-described procedure is repeated for all samples provided. For each batch the computer makes available the deviations from the upper and lower control limits and produces graphs showing variations of the mean OD, mean wall thickness and mean ID of the samples as they are made available. Essentially, the mean parameters are plotted as a function of time, since the samples are measured as they are made available. In any case, in which a mean OD or mean wall thickness of a sample exceeds the upper limit or is less than the lower limit, prompt consideration is given to adjusting the pilgering process.

Typically, samples are taken from a batch at intervals of two hours. At the start of the processing of a batch, after the first pass, only one sample may be evaluated. If the mean OD or mean wall thickness for this one sample exceeds the upper limit or is less than the lower limit, another sample is taken as soon as practicable, earlier than the end of the two-hour interval and the results obtained with the first sample are considered in the light of the results obtained with the second sample.

Figure 10:
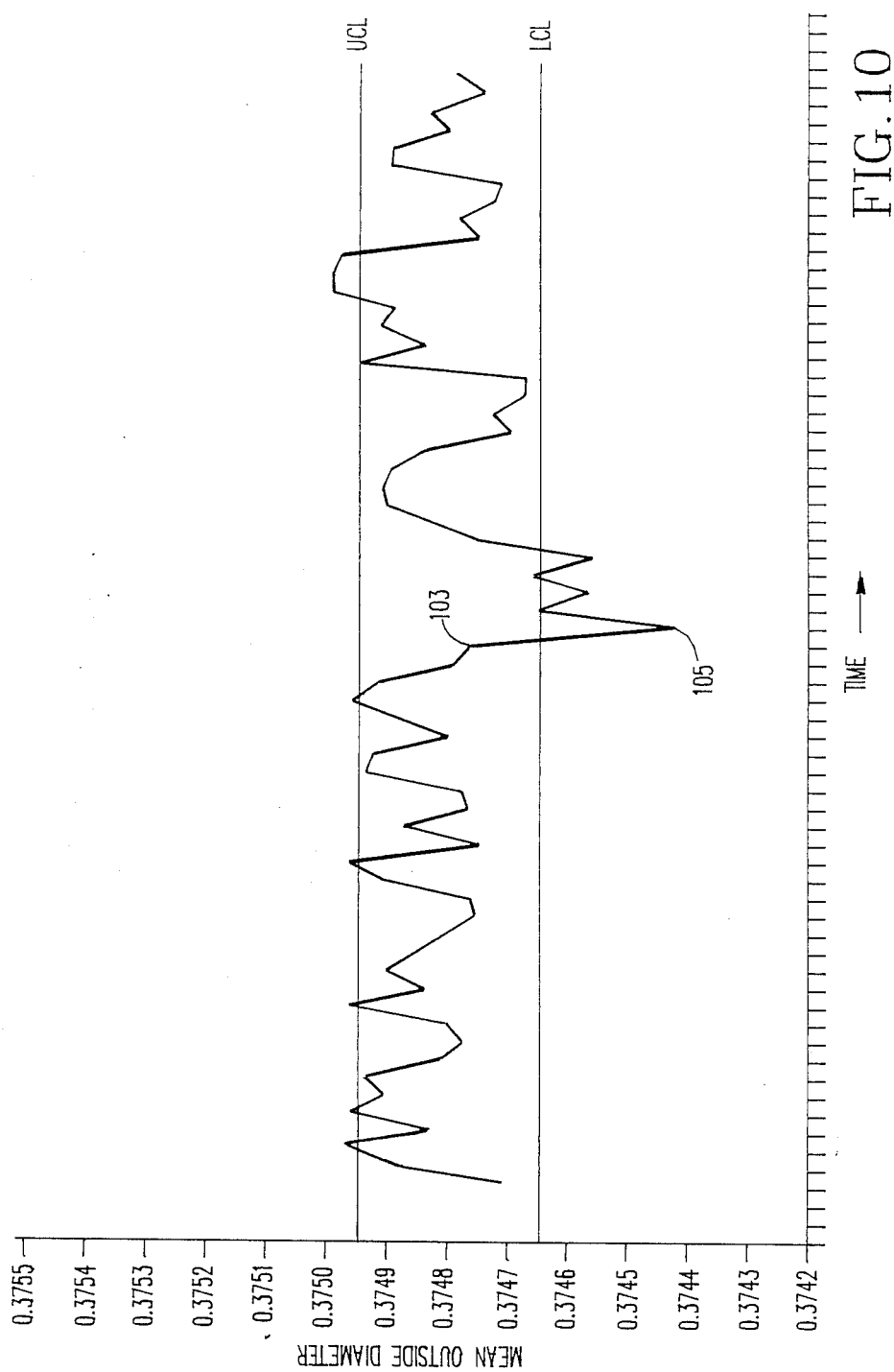
FIG. 10 is a graph showing the mean outside diameters, measured in the practice of this invention, of the sample tubes obtained from the blanks produced in 14 continuous successive shifts.
Figure 11:
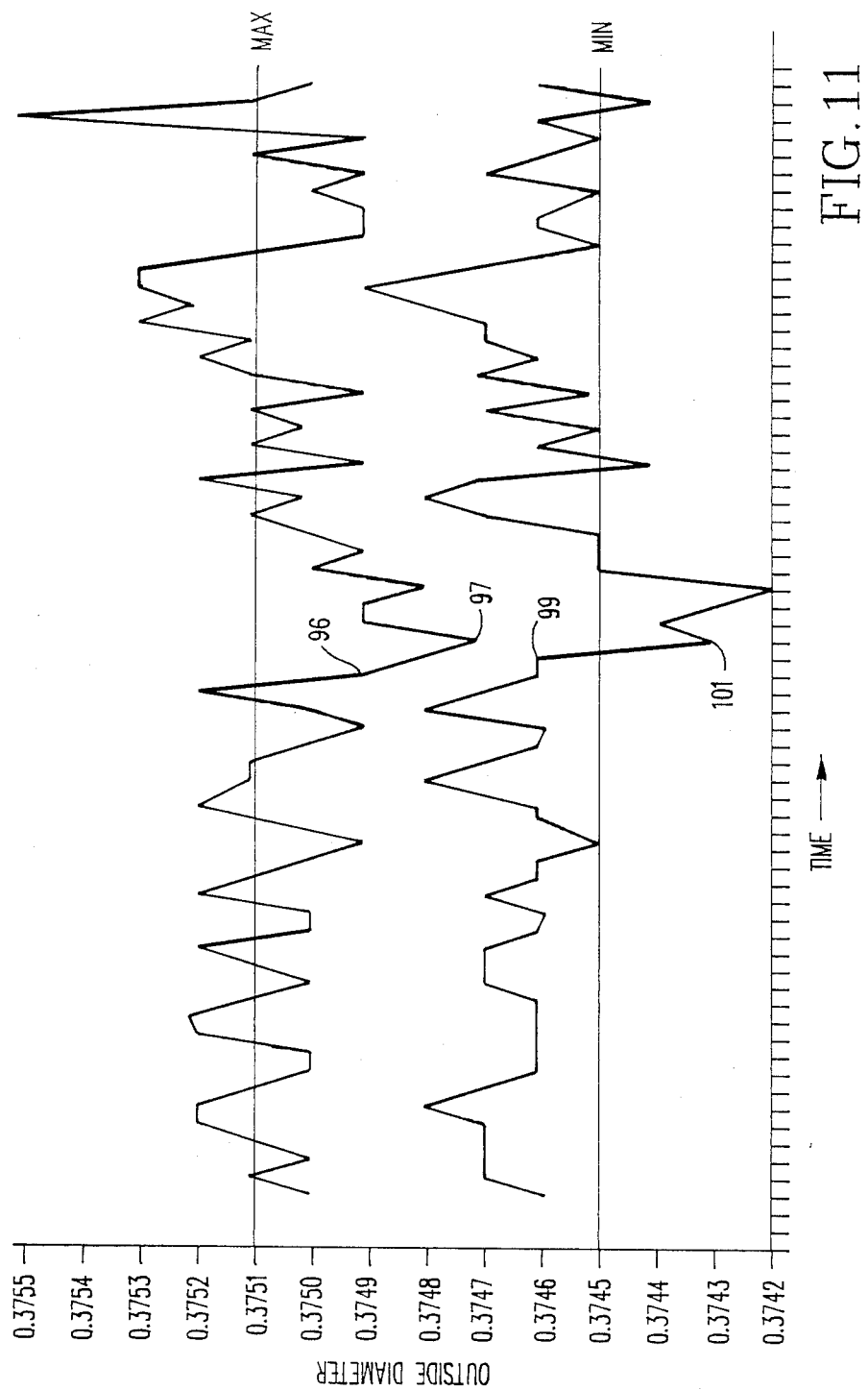
FIG. 11 is a graph showing the maximum and minimum outside diameters measured in accordance with prior art practice of the same sample tubes.
Figure 12:
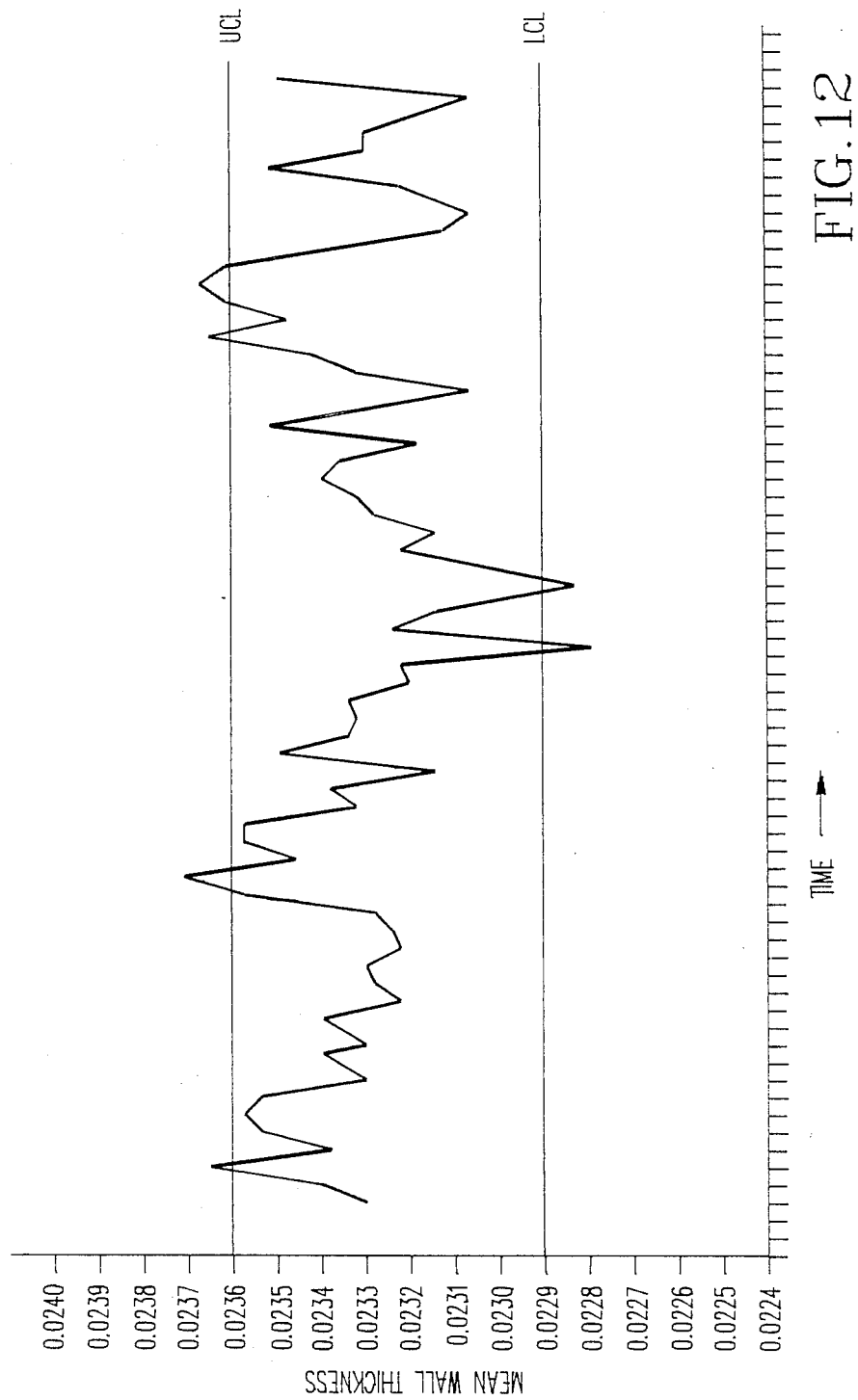
FIG. 12 is a graph showing the mean wall thickness, measured in the practice of this invention, of the same sample tubes.
Figure 13:
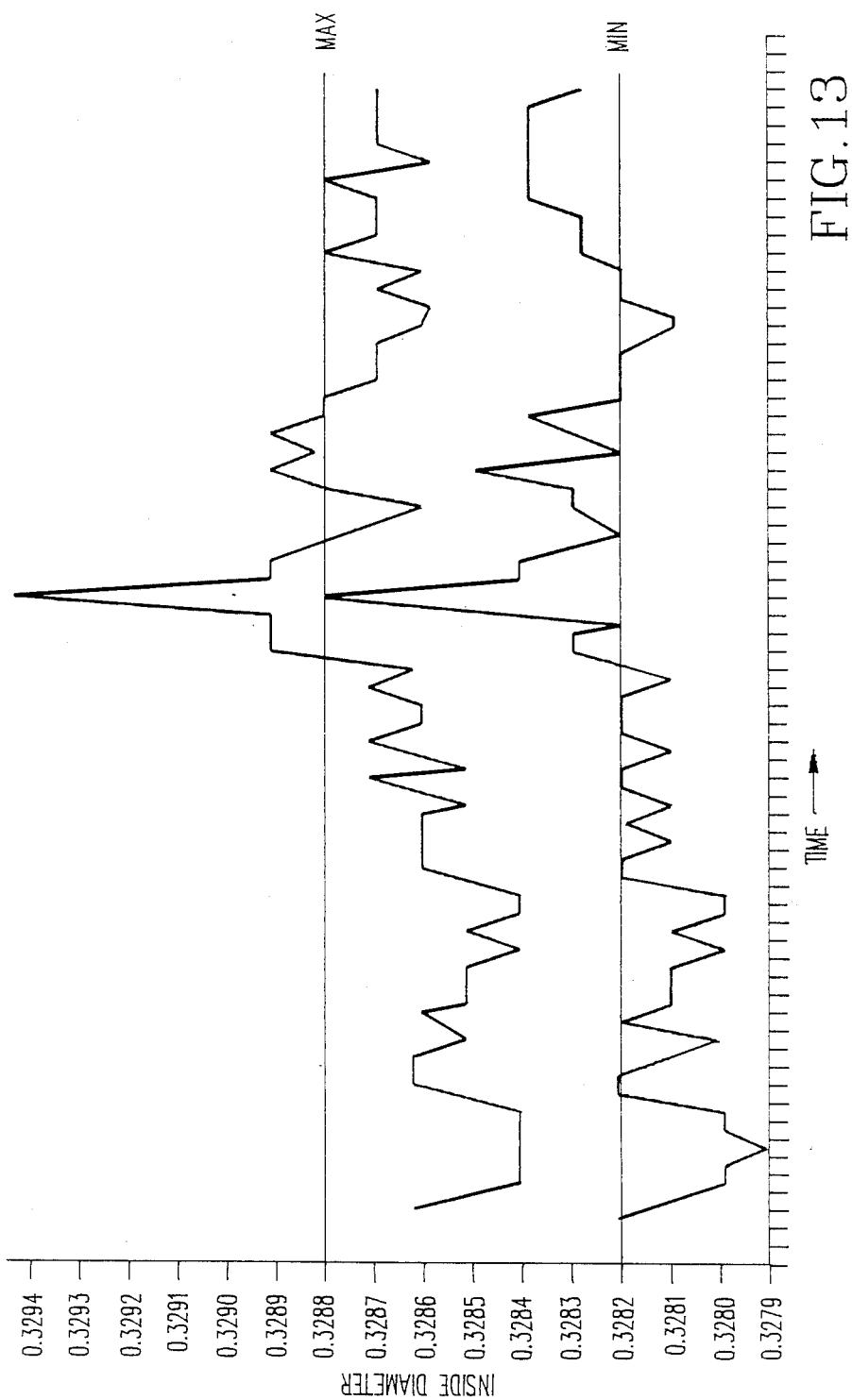
FIG. 13 is a graph showing the maximum and minimum ID, measured in accordance with the teachings of the prior art, of the same sample tubes The dimensions shown in FIGS. 3 through 6 are included for the purpose of aiding those skilled in the art in the practice of this invention and not with any intention of in any way limiting the scope of this invention.

In FIGS. 10 through 13 the data obtained, in the practice of this invention, from samples produced during 14 continuous consecutive shifts over a period of 5 consecutive days, are presented graphically. The graphs cover about three consecutively processed batches. In FIGS. 11 and 13, prior are data for the samples are presented. The lines on these graphs extend between points on the graphs each of which corresponds to a sample. The points are plotted for the data derived from consecutive samples.

In FIG. 10 mean outside diameter is plotted vertically and time as measured by the availability of new samples is plotted horizontally. The horizontal lines labeled UCL and LCL represent the upper and lower control limits. The first point on the left indicates that the upper control limit has been exceeded. A new sample is then taken and evaluated as soon as practicable. The second point is within the limits. This may indicate that correction was made after the first sample or that the first measurement was in error.

In FIG. 11 the maxima and minima of the OD, derived in the practice of the prior art with the same samples as were used for FIG. 10, are plotted vertically and time horizontally. The horizontal lines labeled MAX and MIN show the limits. It is to be noted that, in FIG. 11, there are sharp variations between the points 96 and 97 and 99 and 101 which correspond to the sharp variation between points 103 and 105 in FIG. 10.

FIG. 12 corresponds to FIG. 10. It presents the mean wall thickness derived in the practice of this invention as a function of time as measured by the supply of sample 37. FIG. 13 corresponds to FIG. 11. It presents the maxima and minima of the wall thickness derived in the practice of the prior art as a function of time.

In the practice of this invention, a specialized program was developed to facilitate interaction between the inspector, the computer 43, the monitor 90, and the laser micrometer 33. The program is user friendly and has a menu option. The inspector need only use arrow keys on the pad 92 to indicate their appropriate focus and enter keys to input the appropriate data. The computer program is designed to ask the inspector what machine the tube sample came from, the batch number of the sample, and which inspector is performing the test. The computer 43 pulls that particular pilger's file and brings it into memory. When all the preliminary information is complete, the computer will take the first laser picture of the mandrel 41, store the information and make the appropriate calculations. The inspector must hit the enter key at each of the eight points around the tube. When entered into the computer, the OD, the ID and the wall thickness are displayed. The initial reference point taken from the mandrel is also recorded into memory. The program has an internal calibration process whereby the reference points indicate whether the measurements accurately reflect the sample dimensions.

Advantages of this invention, and particularly of the cooperative relationship between the computer 43 and the laser micrometer 33, are that it saves time and avails a more accurate reflection of the sample dimensions or of the dimensions of any hollow cylinder under evaluation than the prior art.

While preferred practice of the method of this invention and a preferred embodiment of this invention has been disclosed herein, many modifications thereof are feasible. This invention is not to be restricted except insofar as is necessitated by the spirit of the prior art.

We claim:

1. The method of determining the parameters for computing the outside diameter, the wall thickness, or the inside diameter of a tube, the said method including: producing a planar laser beam having a sharply defined end, positioning a mandrel in said laser beam with the transverse dimension of said mandrel intersecting the transverse dimension of said laser beam, determining as a first length, the distance along the transverse dimension of said laser beam from said sharply-defined end of said laser beam to the point of said mandrel nearest said sharply-defined end, mounting said tube on said mandrel in said laser beam with the inner wall of said tube in engagement with said mandrel at said nearest point and the transverse dimension of said tube intersecting said laser beam along the transverse dimension of said laser beam, thereby to produce a shadow of said tube, determining, as a second length, the distance from said sharply-defined end of said laser beam to the point of said tube nearest said sharply-defined end of said laser beam, and determining, as a third length, the distance along the shadow of said tube between the shadow of said point of said tube nearest said sharply-defined end of said beam and the shadow of the point of the shadow of said tube most remote from said sharply-defined end of said beam, whereby the outside diameter of said tube is equal to said third length and the wall thickness may be computed by subtracting the second length from the first length, and the inside diameter may be computed by subtracting twice the wall thickness from the outside diameter.

2. The method of claim 1 including the step of rotating said tube about its longitudinal axis while it is mounted on said mandrel over a plurality of randomly selected angles to a plurality of randomly selected angular positions and at each position determining the second and third lengths.

3. The method of claim 2 including the additional step of displacing the tube while said tube is on the mandrel longitudinally on said mandrel and also rotating said tube through an additional plurality of randomly selected angles to an additional plurality of randomly selected angular positions and at each position determining the second and third lengths.

4. The method of claim 2 wherein the first, second and third length for each position of the tube is entered into a computer and the computer computes the outside diameter, the wall thickness or the inside diameter for each position and then computes the mean and standard deviations for the outside diameter, the wall thickness or the inside diameter derived from the first, second and third lengths for all positions of said tube.

5. The method of claim 1 practiced with apparatus including a computer and a laser micrometer for producing the planar laser beam connected to the computer, the said method including entering the first, second and third lengths into said computer and enabling said computer to compute the parameters of the tube.

6. Apparatus for determining the parameters for computing the outside diameter, the wall thickness or the inside diameter of a tube, the said apparatus including a laser micrometer, for producing a planar laser beam, a mandrel, for supporting a tube whose outside diameter, wall thickness or inside diameter is to be determined, and means connected to said mandrel, for positioning said mandrel so that its transverse dimension intersects, and is generally parallel to, the plane of, said laser beam, said tube to be supported on said mandrel so that the transverse dimension of said tube intersects, and is generally parallel to, the plane of said laser beam.

7. The apparatus of claim 6 wherein the mandrel is composed of a material having the hardness of tungsten carbide so that deflection of said mandrel under its weight is substantially precluded.

8. The apparatus of claim 6 wherein the positioning means includes means for suspending the mandrel as a cantilever beam and wherein said mandrel is composed of a material having the hardness of tungsten carbide, whereby the deflection of the mandrel under its own weight is substantially precluded.

9. The apparatus of claim 6 wherein the mandrel includes a circumferential projection for supporting the tube, said projection having a width slightly greater than the width of the laser beam, the positioning means positioning the mandrel so that said projection intersects said laser beam generally centrally of said projection.

10. The apparatus of claim 6 wherein the mandrelpositioning means positions the mandrel with it longitudinal axis generally horizontally and the tube is to be disposed on the mandrel with its longitudinal axis generally horizontally and wherein said apparatus includes a weight and means mounting said weight so that it will engage said tube and level said tube.

11. The method of inspecting a plurality of tubes subject to pilgering at a stage in the pilgering operation to determine if the outside diameter and the wall thickness or the inside diameter are within limits at said stage in the pilgering; the said method comprising: producing a planar laser beam having a sharply-defined end, positioning a mandrel in said beam with its transverse dimension generally parallel to the plane of said beam, determining, as a first length, the distance from said sharply-defined end of said beam to the point on the periphery of said mandrel nearest said sharply-defined end, producing a random sample from a random tube at said stage of the pilgering operation, mounting said sample on said mandrel in the path of said laser beam with its inner surface engaging said mandrel and with the transverse dimension of said tube generally parallel to said plane of said beam, determining, as a plurality of second lengths, the distances between said sharply-defined end of said laser beam and the point of said sample nearest said sharply-defined end, each said last-named distance being measured with said sample at different positions angularly and/or longitudinally of said sample, producing a shadow of said sample as it is illuminated by said laser beam, determining, as a plurality of third lengths, the distances between the shadow of the nearest point of said sharply-defined end of said beam and the shadow of the most remote point from the sharply-defined end of said beam, each said third length being produced with said sample at each of said different positions angularly and/or longitudinally of said sample, computing wall thickness magnitudes for each position of said sample by subtracting each second length for said position from the first length, computing the means of said wall thickness magnitudes, computing the deviation from the mean for each of said wall thickness, computing the outside diameter or inside diameter magnitude of said sample for each of said positions of said sample, computing the mean for said outside diameter or inside diameter magnitudes, and computing the deviation from the means for each said magnitude.

12. The method of claim 11 including the steps of entering the first length, the second length, and the third length in a computer, programming the computer to compute the deviations from the mean of the wall thickness magnitudes, programming said computer to produce a graph showing said deviations, programming the computer to compute the deviations from the mean of the outside diameter magnitudes and programming the computer to produce a graph showing said deviations from the means of the outside diameter magnitudes.

13. The method of claim 11 including the steps of entering the first length, the second length, and the third length in a computer, programming the computer to compute the deviations from the mean of the wall thickness magnitudes, programming said computer to produce a graph showing said deviations, programming the computer to compute the deviations from the mean of the inside diameter magnitudes and programming the computer to produce a graph showing said deviations from the means of the inside diameter magnitudes.

* * * * *